(12) United States Patent
Soni et al.

(10) Patent No.: US 11,302,312 B1
(45) Date of Patent: Apr. 12, 2022

(54) SPOKEN LANGUAGE QUALITY AUTOMATIC REGRESSION DETECTOR BACKGROUND

(71) Applicant: Amazon Technologies, Inc., Seattle, WA (US)

(72) Inventors: Ajay Soni, Seattle, WA (US); Xi Chen, Seattle, WA (US); Jingqian Zhao, Seattle, WA (US); Liu Yang, Seattle, WA (US); Prathap Ramachandra, Seattle, WA (US); Ruiqi Luo, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 283 days.

(21) Appl. No.: 16/585,988

(22) Filed: Sep. 27, 2019

(51) Int. Cl.
  *G10L 15/07* (2013.01)
  *G10L 15/06* (2013.01)
  *G10L 15/18* (2013.01)

(52) U.S. Cl.
  CPC ............ *G10L 15/07* (2013.01); *G10L 15/063* (2013.01); *G10L 15/1815* (2013.01); *G10L 2015/0635* (2013.01)

(58) Field of Classification Search
  CPC ... G10L 15/07; G10L 15/063; G10L 15/1815; G10L 2015/0635
  See application file for complete search history.

(56) References Cited

U.S. PATENT DOCUMENTS

| | | | | |
|---|---|---|---|---|
| 9,600,231 B1 * | 3/2017 | Sun | ......................... | G10L 15/02 |
| 10,706,848 B1 * | 7/2020 | Greene | .................... | G06F 3/167 |
| 10,789,943 B1 * | 9/2020 | Lapshina | .............. | G06F 40/205 |
| 2014/0236570 A1 * | 8/2014 | Heck | .................. | G06F 16/3329 704/9 |
| 2017/0256270 A1 * | 9/2017 | Singaraju | ................ | G10L 25/21 |
| 2018/0293988 A1 * | 10/2018 | Huang | ..................... | G10L 17/20 |
| 2018/0358005 A1 * | 12/2018 | Tomar | ..................... | G10L 15/22 |

OTHER PUBLICATIONS

Chen et al., "Recurrent Neural Networks for Automatic Replay Spoofing Attack Detection," 2018 IEEE International Conference on Acoustics, Speech and Signal Processing (ICASSP), 2018, pp. 2052-2056, doi: 10.1109/ICASSP.2018.8462644. (Year: 2018).*
Kim Joo-Kyung, et al., "Joint Learning of Domain Classification and Out-of-Domain Detection with Dynamic Class Weighting for Satisficing False Acceptance Rates," arXiv:1807.00072v1 [cs.CL], Jun. 28, 2018 (Year: 2018).*

* cited by examiner

*Primary Examiner* — Michelle M Koeth
(74) *Attorney, Agent, or Firm* — Knobbe, Martens, Olson & Bear, LLP

(57) ABSTRACT

A new model is introduced into a particular domain that receives a routing of a dialog from a speech processing component. A method associated with the model includes running a set of test utterances through the speech processing component that enables a spoken language dialog with a user to establish a base line score associated with processing for the set of test utterances. The speech processing component determines an intent of the user and routes the spoken language dialog to a network-based domain based on the intent. The method includes establishing an automatic test run of the set of test utterances to obtain a current score and, when a threshold associated with a difference between the current score and the base line score is breached, switching, at the network-based domain, from the false accept detection model to a second model.

19 Claims, 5 Drawing Sheets

SPOKEN LANGUAGE QUALITY AUTOMATIC REGRESSION DETECTOR BACKGROUND

BACKGROUND

This disclosure relates to machine learning algorithms and systems. Devices have been developed for home or other use to enable interaction with the user via a spoken dialog. Examples of such devices include Amazon Alexa and Google Home. These devices connect to a speech processing component which enables users to speak to perform tasks such as making a phone call, asking for music to be played, or initiating a shopping experience. In some scenarios, the speech processing component will analyze a user utterance to determine the intent of the user. The speech processing component can include automatic speech recognition modules and/or natural language understanding modules to determine the user intent. These modules are used to determine the user intent and when they are updated, the output data for determining user intent can change. Traffic patterns such as a volume of traffic and background noise can also change, impacting performance of these systems and downstream components that receive data from the speech processing component.

The computing power and knowledge contained within the speech processing component however is often limited. The speech processing component, based on the determined intent, will route the dialog to one of a number of different network-based domains for handling the specific task. For example, the speech processing component may route the dialog to a shopping domain if the speech processing component determines that the user intent is related to shopping or a communication domain if the intent is related to initiating a telephone call. The speech processing component makes an irreversible decision to route the dialog to a specific domain. In some cases, the routing decision is incorrect and the user experience can thereby be frustrating as the incorrect network-based domain is attempting to continue a dialog for a user intent that does not match the network-based domain.

BRIEF DESCRIPTION OF THE DRAWINGS

Various embodiments in accordance with the present disclosure will be described with reference to the drawings, in which.

While the disclosed technology is described herein by way of example for several embodiments and illustrative drawings, those skilled in the art will recognize that the disclosed technology is not limited to the embodiments or drawings described herein. It should be understood that the drawings and detailed description thereto are not intended to limit embodiments to the particular form disclosed, but on the contrary, the intention is to cover all modifications, equivalents and alternatives falling within the spirit and scope as defined by the appended claims. As used throughout this application, the words "can" or "may" are used in a permissive sense (i.e., meaning having the potential to), rather than the mandatory sense (i.e., meaning must). Similarly, the words "include", "including", and "includes" mean including, but not limited to. Any feature from any embodiment or example can be utilized with any other feature from another embodiment or example.

DETAILED DESCRIPTION

This disclosure provides a novel approach to improving the customer experience related to spoken dialog interactions. The approach disclosed herein involves using signals which are generated by a speech processing component, such as automatic speech recognition (ASR) signals and natural language understanding (NLU) signals, which are not stable across revisions of the ASR model and the NLU model. The unstable nature of these signals is evaluated at a false accept detection model hosted in a particular domain downstream from the speech processing component to determine a cause of regression in the false accept detection model. The basic network in which this innovation applies will be described first followed by more details about the use of the ASR and NLU signals in connection with a false accept detection model.

Figure 1:
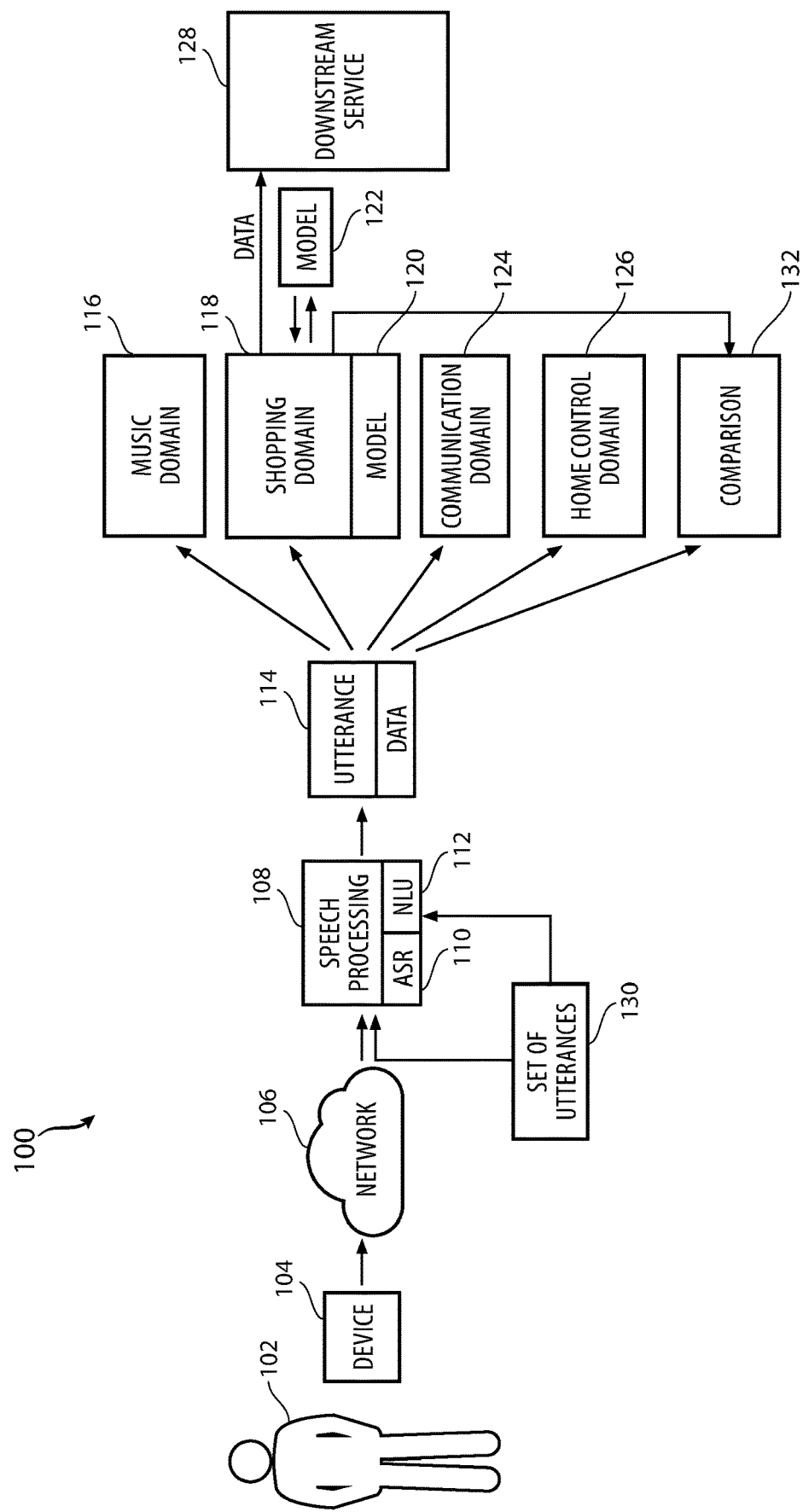
FIG. 1 illustrates an example device and speech processing component communicating with a group of network-based domains.

FIG. 1 illustrates the basic framework 100 associated with this disclosure. A device 104 operates in a location such as the user's home. An example device can be Google Home or Amazon Alexa. The device 104 can of course be any device and is not limited to a device configured in the home. Generally speaking, the device 104 is capable of voice interaction and enables users 102 to articulate commands in natural language and accomplish tasks such as requesting music, making a to-do list, requesting weather reports, or making purchases. Other tasks can include controlling devices within the home such as turning lights on or controlling appliances and heating or air conditioning systems. In one example, the device 104 communicates through a network such as the Internet 106 with a centralized artificial intelligence or machine learning speech processing component, node or network layer 108 that can include an automatic speech recognition (ASR) component 110 and/or a natural language understanding (NLU) component 112. In another aspect not shown in FIG. 1, such components might be configured locally on the device 104. The location of such speech processing components and whether they reside on locally on device 104 or are network-based is not material to this disclosure. In one aspect as shown in FIG. 1, the speech processing component 108 processes the speech and make an intent determination. In another aspect, the processes can be shared across the device 104 and the speech processing component 108, or might be local to the device 104.

As the number of available tasks which the user 102 can accomplish has grown, the infrastructure 100 has evolved as well. While the infrastructure 100 initially included a single network-based server to receive a transition of a dialog from the device 104, given the increased number of available tasks, there are now multiple different network-based domains. The device 104 will interact with the user 102 in a voice dialog and the speech processing component 108 can make a determination regarding the intent of the user 102. If the intent is determined to be a shopping intent, for example, the speech processing component 108 will route the dialog or the utterance to a particular domain 116, 118, 124, 126 associated with that intent. For purposes of this disclosure, the number of domains is not material. Each domain includes a speechlet which represents the components in the respective domain for managing the dialog with the user through the device 104 to provide information or to achieve the tasks associated with the respective domain.

The speech processing component 108 can include different data 114 in its analysis. For example, the routing decision might include several components such as a determination of the proper domain for the utterance such as shopping 118, smart home 126, communication 124, and so forth. The "smart home" domain 126 can relate to the ability of the user to control components within a home such as appliances, lights, security systems, media systems, and so forth through voice commands. The information provided from the speech processing component 108 can also include the utterance itself 114. The data can include an intent associated with the specific domain such as in a shopping scenario, a desire to search, a desire to buy an item or to check a previous order. The data 114 can include slots with additional information such as a specific identification of an item, and order number, a price range, a person to be called, a device within the home to be controlled, and so forth. The data 114 can also include a confidence level such as a numerical ASR score and the speech processing component 108 can develop a hierarchy in which a list of hypothetical predictions or solutions and will be generated. The data 114 can also include binary data such as a contextual signal, data about a previous interaction, and so forth. The data 114 can include categorical information such as a device type related to device 104. The routing decision can be based on the intent having the highest confidence value from the list.

In some scenarios, a device such as a network-based speech processing component 108 that is communicating with a user via a spoken dialog incorrectly determines the intent of the user and routes the dialog to the wrong network-based domain for handling a specific user experience. For example, when a home-based device is engaged in a dialog with the user and believes that the user intent is to purchase a product, the device may communicate speech data to the network-based speech processing component that will route that dialog to a network-based shopping domain for continuing the dialog with the expectation that the user desires to make a purchase. An incorrect routing decision can be called a "false accept." For example, if the user desires to listen to music and says "Play Billy Jean by Michael Jackson", the speech processing component may interpret the phrase "by Michael Jackson" as "buy Michal Jackson" and route the dialog to a network-based shopping domain which expects to handle a discussion about a purchase of a song. In other words, the device interpreted a non-shopping utterance as a shopping related utterance and routed the dialog to be handled by a shopping domain which is not designed for handling a request to listen to music. The customer experience can thereby be less optimal as dialog errors may seek to lead the user to a purchase transaction. As is shown in FIG. 1, a false accept detector (the model 120/122) can be associated with the network-based domain and be designed to reduce false accepts or to improve the handling of false accepts.

The performance of the false accept detector 120/122 can be degraded or regress when there are changes to the speech processing component 108. For example, updates to the ASR module 110 or the NLU module 112 can impact the performance of the false accept detector 120/122.

Changes in traffic patterns can impact the false accept detector 120/122. If such changes occur, there can be a period of time in which a decreased level of performance by the false accept detector 120/122 is experienced until manual corrections can be made. These corrections might involve a user labeling additional data or updating the false accept detector models 120/122 in order to account for the changes. An example of a traffic pattern change could be a change in the background noise experienced at the device 104 when compared with a traditional expected background noise. For example, a device 104 may have been moved from a quiet home to a busy office environment. The change on environment would result in a change in the background noise experience by the system. In another example, a device 104 could experience much more background noise during the holidays, when compared to other quieter times, if the home has more guests that are talking when commands are initiated to the device 104.

This disclosure provides an improvement with respect to how to detect such changes in order to automatically adapt the false accept detector 120/122 and to avoid a regression in model performance. Aspects of the new concept include generating a set of test utterances 130 that are fed through the system 108 to establish a base line score. The system uses the same constant set of test utterances to probe in real-time the performance of the system 120/122 as it processes current utterances and detects false accepts. The test utterances 130 can be fed directly into the speech processing component 108 and do not have to be audibly played at a device 104. The test utterances in some cases could be recorded in a quiet controlled environment with other utterances recorded in noisy environments, such as a home or restaurant. Other variations can include recording users speaking directly into a microphone or other situations where the user is turned away or further away from the microphone. The set of test utterances can be developed to capture a spectrum of the speech that is expected. The test utterances 130 can be audio waveforms provided to the speech processing component 108 for the ASR model 110 or they can be text provided to the NLU model 112. The test utterances 130 can be configured or prepared for easy insertion into the proper component as described herein.

We note herein that the primary examples provided will relate to the speech processing component 108 routing a dialog to the shopping domain. However, this disclosure is broad enough to encompass any domain having a particular task. For example, one domain might relate to playing music while another domain might relate to communication tasks such as a telephone calls or texts. Other domains may be programmed to handle the control of home appliances or devices. Thus, the scope of this disclosure should apply to any domain developed for handling a specific task rather than being limited to a network-based shopping domain. The approach of identifying a change in the model performance and then taking appropriate steps can apply to any domain.

In some scenarios, the model 120/122 can be tuned to expect certain data 114 from the speech processing component 108. That data can be dependent upon the particular configuration of the ASR module 110, the NLU module 112, traffic patterns, and so forth. However, periodically, the ASR module 110 or the NLU module 112, or both, might be updated with additional training data or for other reasons. When such updates occur, the changes to the data 114 that is transmitted to the respective domain 118 can impact the performance of the model 120/122. The performance of the model might regress based on such changes. Changes to traffic patterns can also impact the model performance.

The separate domains were developed to improve the customer experience such that each domain is programmed with separate software to focus on a proper interactive experience for the user having that particular intent. The speech processing component 108, however, often has limited knowledge or processing power when evaluating user utterances to determine intent. The speech processing component 108 might receive some data and utilize some models such as finite state transducer models or specific rules for making intent determinations and routing decisions. These routing decisions are irreversible in that once a user is continuing the dialog having been routed to a particular domain, that particular domain is now communicating with the user and that transition cannot be reversed. Sometimes the routing decisions are incorrect which resulting in false accepts at a respective domain. Example domains include a music domain 116, a shopping domain 118, a communication domain 124, and home control domain 126. Of course other domains can be contemplated as well and this disclosure does not require or rely on a specific functional domains.

As shown in FIG. 1, the shopping domain 118 includes a model 120 embedded in the shopping domain or, as an alternate, a separate model 122 that can be called via an application programming interface or other protocol to evaluate a received utterance to determine if it is a false accept or not. Typically, a file having data associated with the utterance is transmitted from the speech processing component 108 to the respective domain 116, 118, 124, 126. False accepts result in dissatisfaction by customers as they do not get the desired experience. False accepts can add noise and lower the quality of shopping metrics such as a customer action rate, downstream impact, a monthly activation rate or a shopping activation rate. These are example metrics which can all be impacted when a routing decision is wrong and a particular network-based domain that is configured to handle a particular intent has received a routing of a dialog that has a different intent.

The focus of this disclosure is introduce an approach to help maintain good performance on the network-based domain for the model 120/122 to detect false accepts and perform specific corrective actions even in a scenario where updated speech models in the speech processing component 108 have been implemented or when there are other issues like traffic changes which modify the data transmitted to the specific domain and thus false accept detection model 120/122. This disclosure also provides some discussion about the model 120/122 and its operation of detecting false accepts to understand more fully how the disclosed approach for maintaining good model performance will apply.

The model 120/122 can be a machine learning model or a neural network model which predicts whether a given utterance should belong to a particular network-based domain. In one aspect, the model 120/122 performs another check on the intent of the user beyond the determination made at the speech processing component 108.

One building block for the model is a long short-term memory (LSTM) artificial recurrent neural network architecture which uses one or more of a concatenation of word-level features associated with the user utterance, character-level features associated with the utterance, automatic speech recognition output and natural language understanding output. The automatic speech recognition output and natural language understanding output can be treated as features such as numerical features, categorical features or binary features. Since the model uses automatic speech recognition output and natural language understanding output, changes to the automatic speech recognition model and/or natural language understanding models can result in the regression of the false accept detection model.

Word-level features can relate to finding the constituent morphemes and/or morphs of each word in the utterance. The model can combine both the word level features as well as the character level features and pass all of the features to a main long short-term memory layer which can make a final prediction of whether the utterance is been routed correctly to the proper network-based domain. This approach can in one scenario involve the main or multiplicative LSTM is used to produce a sentence or phrase representation. There can be an average feature vector that represents the sentence or phrase with a last feature vector representing an ending notation like a period. The end result of the processing is an utterance-level classification. See, for example, "A Context-based Approach for Dialog Act Recognition using Simple Recurrent Neural Networks" by Bothe et al, ACL Anthology, 2018, incorporated herein by reference.

In one aspect, the model 120/122 provides a secondary analysis of the utterance to determine intent. Generally speaking, the intent is first determined by the speech processing component 108 according to a first protocol or algorithm. That algorithm might look for specific product words or portions of the utterance for clues as to the user intent. Once the dialog is routed to the network-based domain, the model 120/122 applies a second protocol or algorithm to confirm the intent or to determine that it is a false accept. The second protocol or algorithm might, for example, evaluate an entire utterance rather than simply looking for keywords. This can involve utterance-level classification as described above or using other approaches. The second protocol might involve applying more computing power to perform a more robust analysis of the utterance and to thereby adjust confidence scores in what the intent is. The second protocol might apply a different machine learning algorithm or multiple machine learning algorithms in order to more deeply evaluate the utterance for its intent. The second protocol might include a timing component in which an amount of time is identified by which the decision needs to be made in order to maintain the dialog slow. For example, if the initial utterance or dialog has longer pauses, the network-based domain might have an extra second to perform a deeper analysis on the utterance to determine its intent. Or, if the user speaks more quickly, the system may apply a different algorithm to more quickly evaluate whether the routing is a false accept.

Actions taken by the respective domain 118 can include the blacklisting an utterance or routing the dialog to the proper domain. For example, the respective domain model 120/122 might blacklist the phrase "buy michael jackson" or more generically "buy [artist name]" in that the training of the model indicates that that phrase typically does not indicate a desire to purchase the artist but is related to a request to listen to music "by" that artist name. In such a scenario, the system will drop the utterance having the blacklisted phrase and respond by saying something like "I don't understand, please rephrase your request."

In one aspect, the model 120/122 uses the entire utterance from the user 102 when making a decision regarding whether the routing was correct. Other machine learning models may just look at names such as "Harry Potter" and determine that they are related to a shopping domain. However, the model 120/122 would listen to the broader utterance such as "listen to harry potter" or "shop harry potter" and would assign a different or higher shopping confidence score than to just the words "harry potter".

In one aspect, the model 120/122 can be a binary domain classifier which means that it can predict whether the given utterance belongs either to the respective domain or not. If the utterance does not belong to the specific domain, it would be deemed a false accept. In other aspects, the model 120/122 can be expanded to cover more intents as well as more locales in that it can be more multidimensional rather than binary. The models can be implemented in any of the domains and not just the shopping domain 118. The model 120/122 can be developed using collected data of the model output for certain sets of utterances and their annotations. In the shopping domain, the model 120/122 could be applied to process utterances to distinguish sub-intents within the shopping domain 118. For example, the model 120/122 could identify an intent to buy an item or an intent to add the item to a cart. Thus, the model can provide an intent-level granularity and not just a binary classification decision regarding whether the routing was correct.

Thus, in one scenario, the model 120/122 can be characterized as a multiclass intent classifier. The possible outcomes can include a determination that the utterance has a non-shopping intent and is thus a false accept or the output could identify a specific intent related to the shopping domain 118. For example, the following classes or intents could be output for particular utterance: a buy-item intent, a search-item intent, a check-price intent, an add-to-cart intent or add-to-order intent, a browse-to-cart intent or a browse-to-order intent, a cancel-order intent or a check-order-status intent. When one of these intents is output by the model 120/122, it would indicate that the utterance was properly routed to the shopping domain 118 as each of these outputs relate to shopping.

In one aspect, the model 120/122 can detect the error in spoken language understanding or natural language understanding in the routing decision and output an "SLU error" signal downstream to other services 128. Downstream services 128 can represent any component that continues with a user dialog to perform other tasks such as handling a payment, managing a delivery of a product, or continuing with the specific domain tasks, and so forth. Typically the downstream servers 128 are included within each respective domain 116, 118, 124, 126. In another aspect, the downstream service 128 might be a separate component from a respective domain. Part of this disclosure includes the concept of transmitting a signal which indicates or identifies the output of the model 120/122 to a downstream service 128 which can then utilize that information to identify faults accepts. It would be the response ability of the downstream service 128 to make use of that signal to improve the customer experience. For example, if an NLU error resulted in a false accept conclusion that the user wanted to add an item to their shopping cart, the downstream service 124, which might be involved with managing a user shopping cart, should not add an unwanted item to their shopping cart upon receiving the false accept signal from the shopping domain 118 (or directly from the model 120/122). Thus, the network-based domain can improve the customer experience by introducing the new model 120/122, performing an analysis of one or more utterances to determine whether there was a false accept or to make a determination that a more detailed level of granular verity, and then passing that decision and a signal to a downstream service 128.

The downstream service 128 might also receive the more granular intent information. The data received might confirm that the overall shopping intent was correct in the original routing and the false accept detector also determined that the user desires to add the item to their shopping cart and check out later after some additional shopping. This more granular level information can also help to shape and improve dialogs provided by downstream services.

In another example, the speech processing component 108 might properly have performed automatic speech recognition 110 but the NLU component 112 failed to determine the proper intent. The speech processing component 108 might have an item-name-based model that will look at an item name (such as a particular product which is identified in the user utterance) and give a high confidence score to a shopping intent. In this scenario, an item-based model will look for specific named items in a user utterance and not the entire utterance. The model 120/122 associated with the shopping domain 118 can utilize more information from the full utterance and thus the shopping domain 118 will see the SLU result in predicting that the full utterance was misclassified as having a shopping intent. The shopping domain 118 will receive a document 114 which contains information in a particular format. The document can be an XML (Extensible Markup Language) file, a JSON (JavaScript Object Notation) file or any other format that is desirable. The file can include data such as information associated with the confidence score of the intent determined by the speech processing component 108 and can also include the full utterance by the user 102. The domain 118 and can evaluate the utterance and will determine that the NLU result 106 was misclassified as a shopping intent. Thus, the model 120/122 will evaluate independently the intent associated with the (entire) utterance and can output a signal indicating that the NLU determination was in error or not and trust that the downstream service 128 within the domain 118 will take appropriate action. In one example, the downstream service 128 will not give the user 102 a shopping offer for a particular item name as the model 120/122 may conclude that the user does not want to shop.

Certain processing modules may be discussed in connection with this technology. These modules can relate to a specific domain, a model or a downstream service 128. In one example configuration, a module may be considered a service with one or more processes executing on a server or other computer hardware. Such services may be centrally hosted functionality or a service application that may receive requests and provide output to other services or customer devices. For example, modules providing services (such as for any of the specific domains or downstream services in FIG. 1) may be considered on-demand computing that is hosted in a server, cloud, grid or cluster computing system. An application program interface (API) may be provided for each module to enable a second module to send requests to and receive output from the first module. Such APIs may also allow third parties to interface with the module and make requests and receive output from the modules. Third parties may either access the modules using authentication credentials that provide on-going access to the module or the third party access may be based on a per transaction access where the third party pays for specific transactions that are provided and consumed. This can include interactions with a specific domain 116, 118, 124, 126 from a speech processing component 108. In one aspect, the specific domain 118 can be considered a special-purpose computer system which includes a processor and computer components programmed to perform the algorithms disclosed herein.

The following is an approach used by the false accept detection model 120/122 operating in connection with the particular domain 118. The method is practiced in this example from the standpoint of a particular domain, such as the shopping domain 118. The reference to the shopping domain can also be expanded to encompass any particular or respective domain with its associated functionality. The method can include receiving, at a particular domain, a routing of a dialog from a speech processing component, wherein the speech processing component is engaged in the dialog with a user and wherein the speech processing component routed the dialog to the particular domain according to a determination by the device that the user has a determined intent based on an analysis of a user utterance in the dialog, and detecting, at the particular domain and using a neural network or other machine-learning model, whether the user has the determined intent by using the user utterance in its entirety to yield a detection result. The speech processing component 108 can evaluate the user utterance according to an algorithm such as determining whether keywords are spoken which relate to products, for example. The speech processing component 108 would then identify a determined intent of the user based on the algorithm and make a routing decision to a domain according to the determined intent. When the user has the determined intent based on the detection result: routing the dialog at the particular domain to a downstream service. This can include passing the dialog within the domain to a downstream service 128 for continuing to achieve tasks within the context of the determined intent. There are a number of different potential dialog services (within the domain 118) that can receive the dialog according to the determined intent. In one aspect, there can be a single downstream service that automatically receives the dialog following the false accept detection process. Optionally, when the user does not have the determined intent based on the detection result: dropping the user utterance at the particular domain. Dropping that message can include selecting a particular utterance from the system to play to the user indicating that the system does not understand their intent. The particular system utterance associated with dropping the user utterance can be chosen based on the detection result, such as its confidence level, or a predicted user intent. The speech processing component 108 can apply a first algorithm to determine the user intent at that stage and the particular domain 118 can apply a second algorithm to confirm that intent or to determine if there has been a false accept. These algorithms can be of different types, such as one algorithm that spots keywords and makes a routing decision at the speech processing component 108 to route the dialog to a particular platform. Then, at the respective domain 118, a different type of algorithm, such as a full utterance classification algorithm, detects whether there has been a false accept, confirms the user intent and takes additional actions based on the detection result. Once the user intent is confirmed by this second application of an algorithm (which can be the same or of a different type), and the intent is confirmed, the dialog continues within the domain 118 through a downstream service 128 or from a chosen downstream server from a group of services. The detected user intent via application of the model 120/122 can be passed as metadata to the downstream service 128 which can utilize that data in its dialog management.

The shopping domain 118 can be selected by the speech processing component 108 from a plurality of potential domains to which the dialog can be routed. The model can include a long short-term memory artificial recurrent neural network architecture which uses a concatenation of word-level features associated with the user utterance and character-level features associated with the utterance. It is noted that the particular type of machine learning or artificial intelligence modeling associate with the model 120/122 can vary. For example, deep learning algorithms represent a subclass of machine learning that analyzes data through layers. Deep learning can be characterized as a new term for artificial neural networks. The various approaches to machine learning algorithms can be applied to the present technology and to the development of the model 120/122. For example, artificial neural networks, decision trees, support vector machines, Bayesian networks, and genetic algorithms of the various ways of training those algorithms can be applied to the present disclosure.

The detection result from implementing the model 120/122 can identify an error in a natural language understanding intent output associated with the user utterance either as a binary classification or at a more granular level to either identify the intent as a fault accept. In one aspect, the shopping domain calls the neural network model 120/122 in order to detect whether the device produced a false accept of the user utterance as having the purchasing intent. The file associated with an utterance (XML, JSON or other file format) can be passed to the model 120/122 for evaluating and analysis such that the model 120/122 can return a result to the domain 118. An application programming interface can provide a protocol for communicating requests and receiving responses from the model 120/122.

When the user does not have the purchasing intent based on the detection result and the method can include dropping the user utterance at the shopping domain. In one aspect, dropping of the user utterance at the shopping domain can include blacklisting at least a part of the user utterance in the neural network model or can be the result of a blacklisted word or group of words. Blacklisting at least the part of the user utterance further can include applying a regular expression-based rule within the neural network model 120/122. A system utterance can be provided as part of the dropping the user dialog, such as "we don't understand that request, please state it a different way." The system can record detection decisions that lead to continuing the dialog at the domain or for dropping an utterance for future reporting, revision of the detection model 120/122 or other models, or for other purposes.

This disclosure now turns to the more specific aspect of how the false accept detection model 120/122 can deal with changes to the signals or data 114 received from the speech processing component 108. The model 120/122 relies on signals 114 from the speech processing component 108 which provides ASR and NLU results. The signals 114 can include the utterance itself as well. The false accept detection model 120/122 can flag some of the utterances 114 based on certain thresholds set for those signals. The issue is that the scores provided as part of the data 114 can fluctuate because of a number of different causes. For example, traffic patterns may change or a new central ASR model and/or NLU model might be released and implemented on the speech processing component 108. Because the model 120/122 is downstream from the speech processing component 108, the models 120/122 or the specific domain does not know or always have any insight into what upgrades have been made to the upstream speech processing component 108 or what changes are experienced in the environment around the device 104. This approach introduces a process of testing the upstream models and analyzing received data to seek to determine what causes a regression in model performance.

The performance of model 120/122 can be analyzed to detect regression caused in false accept detection. Typically, the detection of change in performance in the model 120/122 is reactive and requires administrators to do a root cause analysis and then to perform manual annotations to bring the performance of the models 120/12 to back up to a proper level. Looking for the root causes can involve picking randomly, or according to a strategy, received utterances and manually checking the false accept decision for those utterances. Humans may then manually label those utterances to retrain the model 120/122, which is a process that can take weeks.

Accordingly, when a traffic pattern changes or a new ASR model 110 or NLU model 112 is released, the performance of the false accept detection model 120/122 can degrade and cause a poor customer experience during the time period prior to the manual intervention and updating of the models 120/122.

Figure 2A:
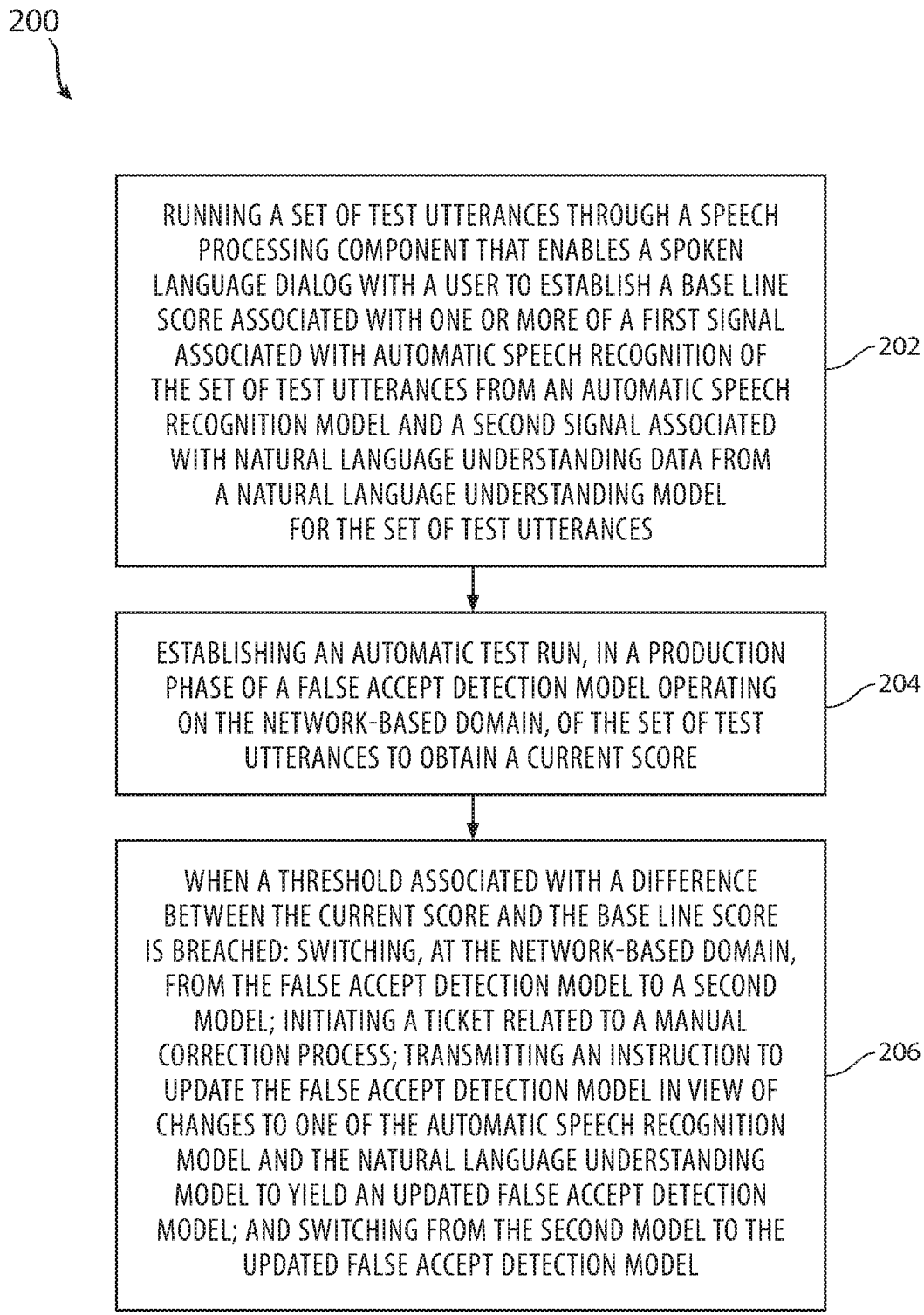
FIG. 2A illustrates a method example.

The solution as disclosed herein is to eliminate at least to some degree the human efforts needed to detect these regressions and make appropriate corrections by implementing a new approach. This approach enables the system to test the performance of a domain that is downstream from the speech processing component 108. FIG. 2A illustrates an example method 200 in this regard. A method includes running a set of test utterances through a speech processing component that establishes a base line score associated with one or more of a first signal associated with automatic speech recognition of the set of test utterances from an automatic speech recognition model and a second signal associated with natural language understanding data from a natural language understanding model for the set of test utterances (202). In one aspect, the base line score can be a comparison 132 of data 114 received from the spoken dialog component 108 with data output from the application of the model 120/122. The comparison 132 can be a comparison of specific data as well, such as specific data from the ASR model 110 compared to an ASR model application from the false accept detector 120/122. The comparison 132 can be based on NLU data from the respective models. The base line score obtained from the comparison 132 establishes how the input data to the domain 118 is compared with the output data from the speech processing component 108. The data in each case can be contained within a formatted file for containing speech related data, confidence scores, the utterance, slots, etc. The systems can reach into the formatted file and compare specific data from that file, such as ASR data or NLU data separately, to determine if a threshold is met and whether a regression has occurred. By addressing specific data in the formatted file, the system may be able to also detect specifically the cause of the regression, such as an update to the ASR model 110.

One way of isolating the specific cause of a regression can include suppressing or turning off some aspects of the model 120/122. For example, the formatted input file 114 could be run through the ASR component of the model 120/122 to isolate and determine whether the comparison with respect to ASR is the problem. This would help to identify that the ASR model 110 is the issue.

The speech processing component 108 determines an intent of the user based on a user utterance in the spoken language dialog and routes the dialog to a network-based domain 118 chosen from a plurality of network-based domains based on the intent. The method further includes establishing an automatic test run, in a production phase of a false accept detection model operating on the network-based domain, of the set of test utterances 130 to obtain a current score (204) and when a threshold associated with a difference between the current score and the base line score is breached, switching, at the network-based domain, from a false accept detection model to a second model, initiating a ticket related to a manual correction process, transmitting an instruction to update the false accept detection model in view of changes to one of an automatic speech recognition model and a natural language understanding model to yield an updated false accept detection model and switching from the second model to the updated false accept detection model (206). The ticket referenced can be with reference to the ASR/NLU models, the false accept detection model 120/122 or some other corrective action. The test utterances can be held constant or could be modified based on a number of parameters, but it is preferable that they are kept constant. The second model can be the false accept detection model 120/122 which does not use the ASR/NLU signals until the issue causing the regression is solved. In other words, the data used by the false accept detection model 120/122 can be adjusted or filtered which can result in a "second model" for determining false accepts.

By maintaining the test set of utterances 130 as constant, the system can detect changes to the ASR/NLU models 110/112 at the domain 118 and take appropriate action. The detection can involve determining differences in output distributions from the speech processing component 108. In another aspect, the utterances can be updated. For example, the system may record 10,000 utterances every month and then use the respective new set of utterances as the baseline and then compare the performance of the system on current utterances from the most recent baseline.

When the threshold associated with the difference between the current score and the base line score is breached, the method can include determining that a traffic pattern has changed. In another aspect, the method includes isolating, from data associated with determining when the threshold associated with the difference between the current score and the base line score is breached, whether a change has occurred in the speech processing component, the automatic speech recognition model and/or the natural language understanding model. In other words, the system may perform a more detailed analysis of the data to determine a specific cause the regression.

The timing of running a test run to establish a new base line score can occur on a weekly basis or any specific time or variable time. It can be run based on scheduled updates to components in the speech processing component 108. For example, if the models 110/112 are updated every two weeks, a new test base line can be established before the update such that the impact of each periodic update can be tested with respect to the model 120/122 performance. Other triggering events can cause a system to establish a new test run to create a new base line. If the system does not know an update schedule for speech components 110/112, then its own schedule may need to be established for creating new base line scores. A schedule can also be established based on a historical review of when changes to the models 110/112 have been experienced by the false accept detection model 120/122.

In another aspect, the method can include updating the set of test utterances to yield an updated set of test utterances, running the updated set of test utterances through the speech processing component to establish an updated base line score, and establishing a second automatic test run, in the production phase of the updated false accept detection model, of the updated set of test utterances to obtain an updated current score at the network-based domain. When a second threshold associated with a second difference between the updated current score and the updated base line score is breached, the method includes switching from the updated false accept detection model to a third model, transmitting a second instruction to update the updated false accept detection model in view of changes to one of the automatic speech recognition model and the natural language understanding model to yield a new updated false accept detection model and switching from the third model to the new updated false accept detection model.

The approach disclosed herein enables a different model 120/122 to be automatically applied when a regression of the currently applied model 120/122 is experienced. The transition to the different model can improve the performance above that which is being experienced by the currently applied model 120/122. This transition enables administrators to determine the actual causes of the regression while the backup model is in production, and to make appropriate corrections or updating. Then the system implements an updated model which addresses the root causes of the regression and therefore would provide a higher level of performance relative to the false accept detector 120/122.

The threshold associated with the difference between the current score and the base line score being breached can indicate a regression in a performance of the false accept detection model 120/122. In another aspect, determining when the threshold associated with the difference between the current score and the base line score is breached can be associated with isolating first data in the current score against second data in the base line score to determine whether the difference applies to changes in the automatic speech recognition model 110 and/or changes in the natural language understanding model 112.

The false accept detection model 120/122 can include a machine learning detection model. The approach disclosed herein could apply to any type of model as well, such as a quantity detection model, a brand detection model and a unit of measurement detection model. Any of these models can benefit from the regression testing approach described herein. Models beyond speech processing could also utilize this approach as well, such as image or video processing models or gesture recognition models.

Figure 2B:
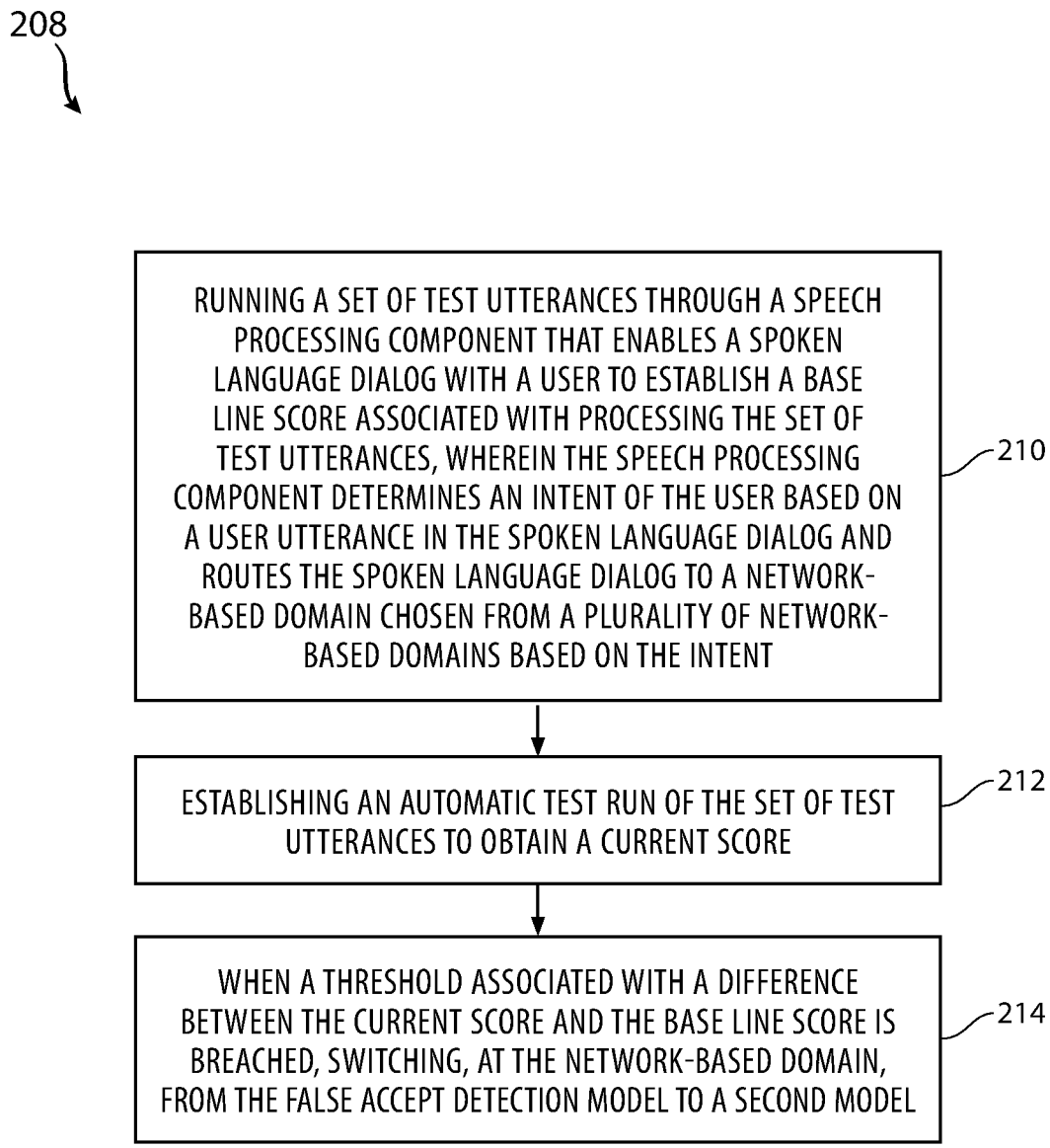
FIG. 2B illustrates another method example.

FIG. 2B illustrates a variation of the method of FIG. 2A. As shown, a method 208 can include running a set of test utterances through a speech processing component that enables a spoken language dialog with a user to establish a base line score associated with processing the set of test utterances, wherein the speech processing component determines an intent of the user based on a user utterance in the spoken language dialog and routes the spoken language dialog to a network-based domain chosen from a plurality of network-based domains based on the intent (210), establishing an automatic test run of the set of test utterances to obtain a current score (212) and, when a threshold associated with a difference between the current score and the base line score is breached, switching, at the network-based domain, from the false accept detection model to a second model (214). The switching to the second model can be in "real time" and automated in order to prevent a regression in the user experience in the spoken dialog system. The switch can occur within a spoken dialog or at the conclusion of a spoken dialog with a user. In one aspect, the second model is the same false accept detection model 120/122 with some adjustments made such that the model does not use the problematic ASR/NLU signals until the issue causing the regression is solved. In another aspect, the second model can be the false accept detection model which does not use one or more of the automatic speech recognition signals associated with the current score and/or natural language understanding signals associated with the current score.

In one aspect, the running of the set of test utterances involves testing the speech processing component 108 by the domain or in connection with the model 120/122 because the domain operating the model 120/122 does not know of implemented changes to the upstream component 108. In the pipeline framework 100 with upstream and downstream services, those services that are downstream do not know details of updates or changes to upstream models. The test set can be updated throughout the process. The test utterances 130 are played through a device 104 or directly into the component 108. The system benchmarks or audits the test utterances to determine changes in the scoring distribution.

Determining when the threshold associated with the difference between the current score and the base line score is breached can be associated with isolating first data in the current score against second data in the base line score to determine whether the difference applies to changes in an automatic speech recognition model or changes in an natural language understanding model, or to some change in traffic patterns. Changes to the models can alter the distribution of recognition or understanding scores in the data 114. This change in the distribution of confidence scores can impact the model 120/122.

Other causes, such as traffic pattern changes, of the regression in the false accept detector 120/122 can also be detected or determined. The false accept detection model can be one of a machine learning detection model, a quantity detection model, a brand detection model and a unit of measurement detection model. An example of regression can be where the system traditionally identified X number of false accepts in a given time period, and that number is reduced or perhaps increased beyond a threshold, which can indicate a change in performance. An example of traffic pattern changes can be where typical audio experienced by the device 104 has a quiet background. Then, around the holidays, much more background noise is experienced because additional people are in the room talking when the person 102 commands the device 104 to perform a task. This additional background noise can result in lower confidence scores in ASR or NLU results from the speech processing component 108. These changes in scores are received as part of the data 114 at a domain 118. By running a constant set of utterances 130 through the system 108, when the system 108 processes speech with new background noise that was not present in the set of utterances 130, the changes in performance will be experienced in that the data 114 sent to the domain 118 will differ, which can cause a change in performance of the models 120/122.

The concepts disclosed above can also apply to improvement or testing the performance of any downstream component from the speech processing component 108. Thus, these principles would not be limited to a particular domain or a particular device but for any domain or any device that receives a transition of a dialog from the speech processing component 108 and that utilizes data 114 provided from the speech processing component 108.

Figure 3:
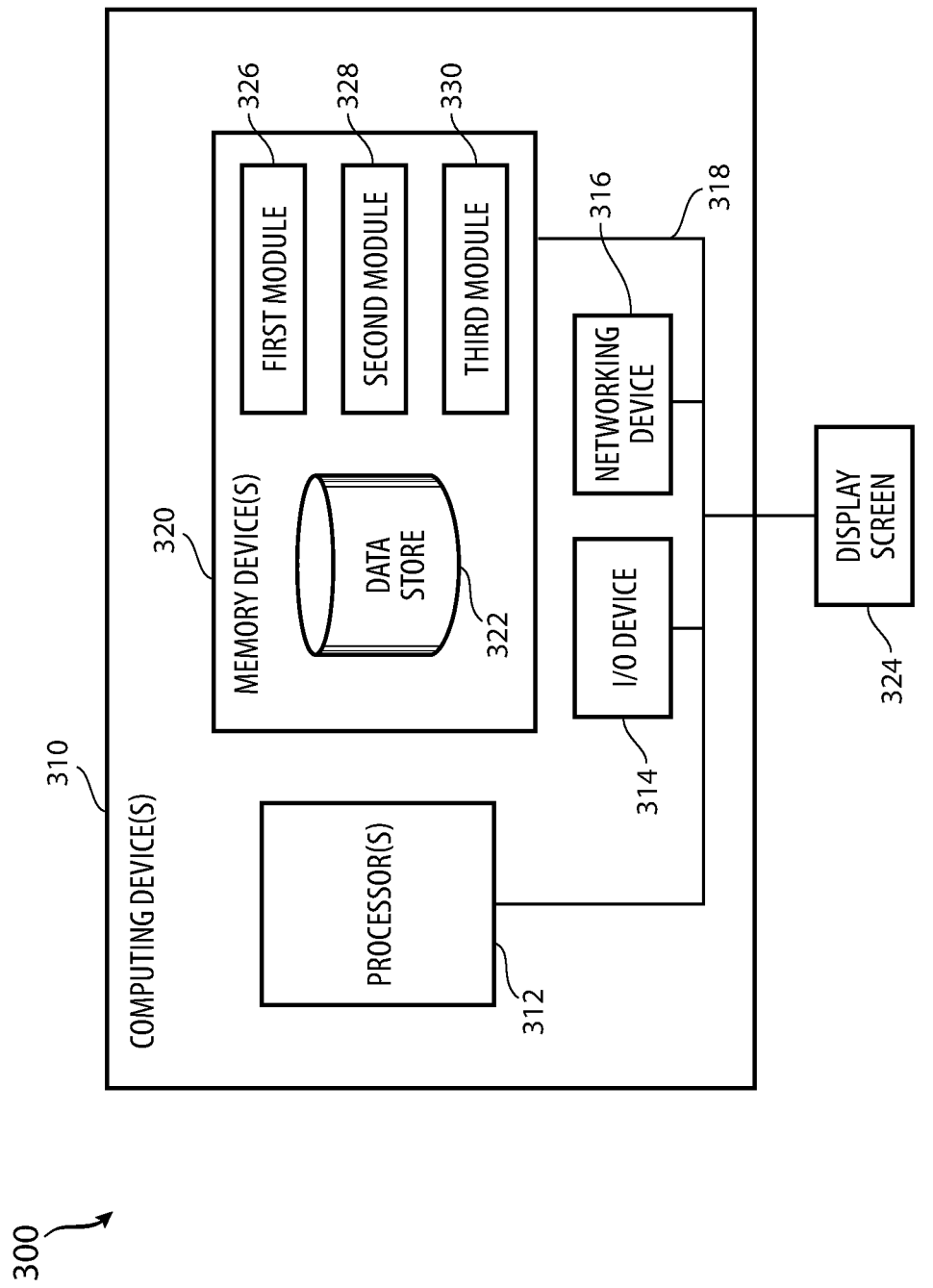
FIG. 3 illustrates an example system embodiment.

FIG. 3 illustrates a computing device 310 on which modules of this technology may execute. For example, one or more of the components shown in FIG. 3 can be used to represent hardware features of device 104, or the speech processing component 108 and/or features used for a respective domain or downstream service. A computing device 310 is illustrated on which a high level example of the technology may be executed. The computing device 310 may include one or more processors 312 that are in communication with memory devices 320. The computing device 310 may include a local communication interface 318 for the components in the computing device. For example, the local communication interface 318 can be a local data bus and/or any related address or control busses as may be desired.

The memory device 320 may contain modules that are executable by the processor(s) and data for the modules. Located in the memory device 320 are modules executable by the processor. For example, a first module 326, a second module 328, and a third module 330, as well as other modules, may be located in the memory device 320. These modules can perform operations such as speech recognition or natural language understanding, or could perform a routing decision. A data store 322 may also be located in the memory device 320 for storing data related to the modules and other applications along with an operating system that is executable by the processor(s) 312. Each module represents a combination of software programming and a hardware component to carry out program steps and does not encompass a signal per se.

The computing system 310 of FIG. 3 may be utilized for providing the trained neural networks as disclosed herein. For example, the first module 326 can be used to make predictions on user intent. The second module 328 may select a network-based domain for dialog routing. The third module 330 may rank the various hypothesis of the user intent in an utterance or may determine whether a routing is a false accept or not.

The computing device 310 may further include or be in communication with a device 324, which may include a display device or other computing device. The device 324 may be available for an administrator to use in interfacing with the computing device 310, such as to review operation of the system, modify rewards, make improvements to the system and so forth.

Various applications may be stored in the memory device 320 and may be executable by the processor(s) 312. Components or modules discussed in this description that may be implemented in the form of software using high programming level languages that are compiled, interpreted or executed using a hybrid of the methods. Any component can be a virtual component as well.

The computing device 310 may also have access to I/O (input/output) devices 314 that are usable by the computing devices. An example of an I/O device 314 is a display screen 324 that is available to display output from the computing devices. The I/O device 314 might represent a speech interface enabling a user to speak to a microphone and hear responsive system utterances through a speaker. Other known I/O devices may be used with the computing device as desired. Networking device 316 and similar communication devices may be included in the computing device 310. The networking device 316 may be a wired or wireless networking device 316 that connects to the internet, a LAN, WAN, or other computing network.

The components or modules that are shown as being stored in the memory device 320 may be executed by the processor 312. The term "executable" may mean a program file that is in a form that may be executed by a processor 312. For example, a program in a higher level language may be compiled into machine code in a format that may be loaded into a random access portion of the memory device 320 and executed by the processor 312, or source code may be loaded by another executable program and interpreted to generate instructions in a random access portion of the memory to be executed by a processor 312. The executable program may be stored in any portion or component of the memory device 320. For example, the memory device 320 may be random access memory (RAM), read only memory (ROM), flash memory, a solid state drive, memory card, a hard drive, optical disk, floppy disk, magnetic tape, or any other memory components.

The processor 312 may represent multiple processors and the memory 320 may represent multiple memory units that operate in parallel to the processing circuits. This may provide parallel processing channels for the processes and data in the system. The local interface may be used as a network to facilitate communication between any of the multiple processors and multiple memories. The local interface may use additional systems designed for coordinating communication such as load balancing, bulk data transfer, and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped.

Some of the functional units described in this specification have been labeled as modules, in order to more particularly emphasize their implementation independence. For example, a module may be implemented as a hardware circuit including custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, include one or more blocks of computer instructions, which may be organized as an object, procedure, or function. Nevertheless, the executables of an identified module need not be physically located together, but may include disparate instructions stored in different locations which include the module and achieve the stated purpose for the module when joined logically together.

A module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

Figure 4:
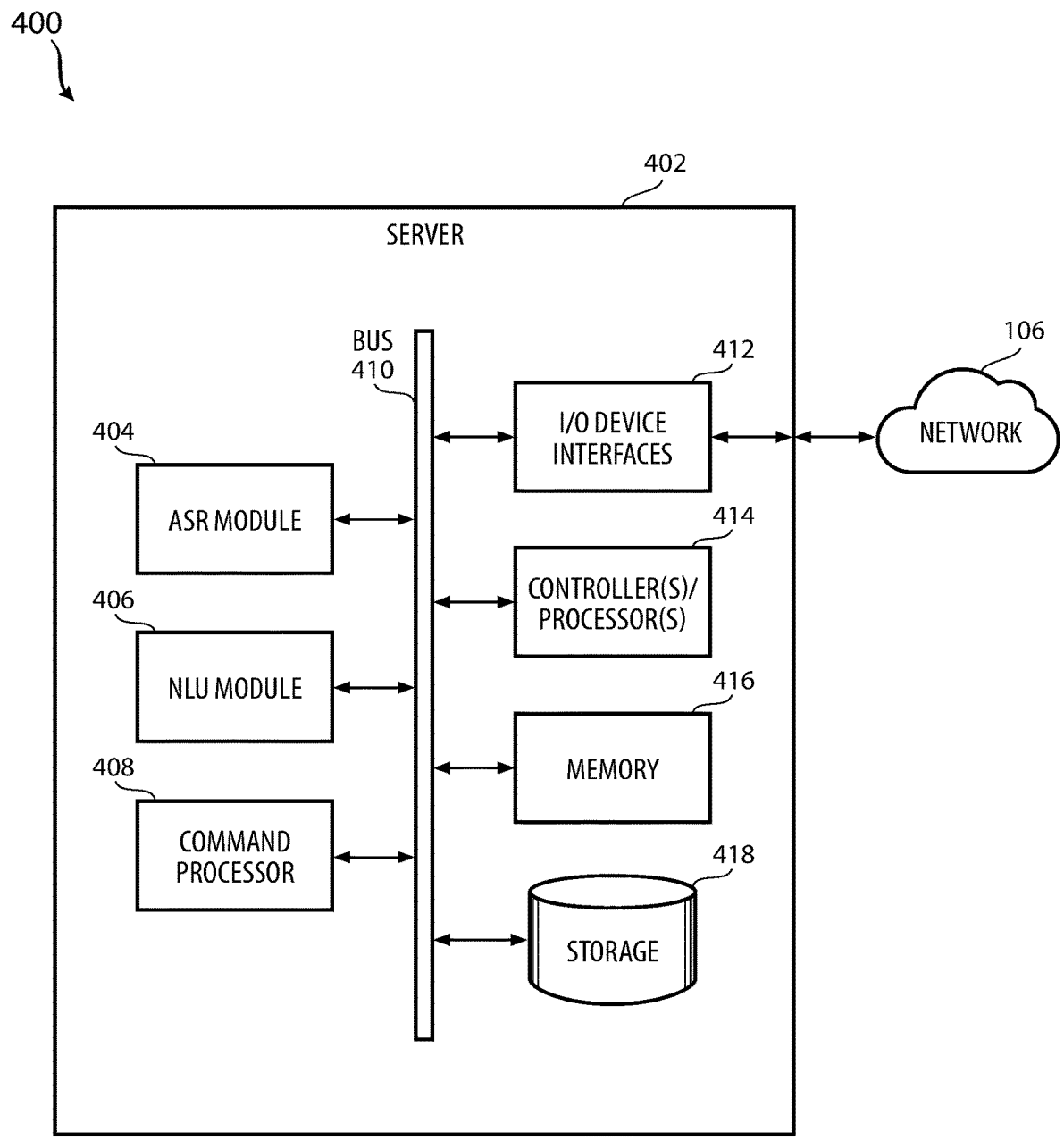
FIG. 4 illustrates an example speech processing component.

FIG. 4 illustrates an example speech processing component 108 which can be implemented as part of this disclosure. FIG. 4 is a block diagram conceptually illustrating example components a remote server 402 that may assist with ASR, NLU processing, or command processing. Server 402 may also assist in determining similarity between ASR hypothesis results as described above. Multiple such servers 402 may be included in the system, such as one server for ASR, one server for NLU, etc. In operation, each of these devices may include computer-readable and computer-executable instructions that reside on the device 402, as will be discussed further below.

The device 402 can include one or more controllers/processors 414 that may each include a central processing unit (CPU) for processing data and computer-readable instructions, and a memory 416 for storing data and instructions of the device. The memories 416 may individually include volatile random access memory (RAM), non-volatile read only memory (ROM), non-volatile magnetoresistive (MRAM) and/or other types of memory. The device may also include a data storage component 418, for storing data and controller/processor-executable instructions. Each data storage component may individually include one or more non-volatile storage types such as magnetic storage, optical storage, solid-state storage, etc. Each device may also be connected to removable or external non-volatile memory and/or storage (such as a removable memory card, memory key drive, networked storage, etc.) through input/output device interfaces 412.

Computer instructions for operating the device 402 and its various components may be executed by the device's controller(s)/processor(s)/414, using the memory 416 as temporary "working" storage at runtime. A device's computer instructions may be stored in a non-transitory manner in non-volatile memory 416, storage 418, or an external device(s). Alternatively, some or all of the executable instructions may be embedded in hardware or firmware on the respective device in addition to or instead of software.

The device 402 includes input/output device interfaces 412. A variety of components may be connected through the input/output device interfaces, as will be discussed further below. Additionally, the device 402 may include an address/data bus 410 for conveying data among components of the device. Each component within the device 402 may also be directly connected to other components in addition to (or instead of) being connected to other components across the bus 410.

The device 402 may include an ASR module 404. The ASR module 404 may include the language models stored in ASR model storage component, and an ASR module 404 that performs the automatic speech recognition process. If limited speech recognition is included, the ASR module 404 may be configured to identify a limited number of words, such as wake words of the device, whereas extended speech recognition may be configured to recognize a much larger range of words. The ASR module 404 can include machine learning components, deterministic processes as well as non-deterministic processes to analyze speech and produce text.

The device 402 may include a limited or extended NLU module 406. The NLU module 406 may include a named entity recognition module, an intent classification module and/or other components that can be deterministic or non-deterministic. The NLU module 406 may also include a stored knowledge base and/or entity library, or those storages may be separately located. The device 402 may also include a command processor 408 that is configured to execute commands associate with an ASR hypothesis.

Multiple devices may be employed in a single speech processing system. In such a multi-device system, each of the devices may include different components for performing different aspects of the speech processing. The multiple devices may include overlapping components. The components of the devices 104 and the server 402, are exemplary, and may be located a stand-alone device or may be included, in whole or in part, as a component of a larger device or system. The device 402 of course can include one or more servers as well.

The technology described here may also be stored on a computer readable storage medium or device that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology. As used herein, the terms "medium" and "media" may be interchangeable with no intended distinction of singular or plural application unless otherwise explicitly stated. Thus, the terms "medium" and "media" may each connote singular and plural application. A computer-readable media or device does not constitute a signal per se independent of any hardware component.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

Embodiments of this disclosure can be claimed from the standpoint of any component disclosed herein. Embodiments could encompass a combination of operations performs in two or more particular layers in any order. In one example, claims could be directed to a product by process in which the output of a false accept detection model can be the subject of a claim or the trained deep neural network model could be the subject of a claim. Claims can be developed from the standpoint of the downstream service 128 and the data received and actions taken in that environment based on a received signal indicating the detection result of the model 120/122.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method comprising:
    running a set of test utterances through a speech processing component that enables a spoken language dialog with a user to establish a base line score associated with one or more of a first signal associated with automatic speech recognition of the set of test utterances from an automatic speech recognition model and a second signal associated with natural language understanding data from a natural language understanding model for the set of test utterances, wherein the speech processing component determines an intent of the user based on a user utterance in the spoken language dialog and routes the spoken language dialog to a network-based domain chosen from a plurality of network-based domains based on the intent;
    establishing an automatic test run, in a production phase of a false accept detection model operating on the network-based domain, of the set of test utterances to obtain a current score, wherein the set of test utterances is held constant; and
    in response to determining that a threshold associated with a difference between the current score and the base line score is breached:
        switching, at the network-based domain, from the false accept detection model to a second model;
        transmitting an instruction to update the false accept detection model in view of changes to one of the automatic speech recognition model and the natural language understanding model to yield an updated false accept detection model;
        switching from the second model to the updated false accept detection model; and
        initiating a ticket related to a manual correction process.

2. The method of claim 1, wherein the network-based domain comprises a shopping domain for handling shopping-related spoken dialogs from the speech processing component.

3. The method of claim 1, wherein when the threshold associated with the difference between the current score and the base line score is breached, the method comprises determining that a traffic pattern has changed.

4. The method of claim 1, further comprising:
    isolating, from data associated with determining when the threshold associated with the difference between the current score and the base line score is breached, whether a change has occurred in the speech processing component, the automatic speech recognition model or the natural language understanding model.

5. The method of claim 1, wherein the false accept detection model comprises a neural network model comprising a long short-term memory artificial recurrent neural network architecture which uses one or more of a concatenation of word-level features associated with the user utterance, character-level features associated with the set of test utterances, automatic speech recognition output and natural language understanding output.

6. The method of claim 1, wherein the false accept detection model comprises a binary classifier which predicts whether the user utterance received at the network-based domain is associated with a configuration of the network-based domain or not.

7. The method of claim 1, further comprising:
    updating the set of test utterances to yield an updated set of test utterances;
    running the updated set of test utterances through the speech processing component to establish an updated base line score;
    establishing a second automatic test run, in the production phase of the updated false accept detection model, of the updated set of test utterances to obtain an updated current score at the network-based domain;
    when a second threshold associated with a second difference between the updated current score and the updated base line score is breached:
        switching from the updated false accept detection model to a third model;
        transmitting a second instruction to update the updated false accept detection model in view of changes to one of the automatic speech recognition model and the natural language understanding model to yield a new updated false accept detection model; and
        switching from the third model to the new updated false accept detection model.

8. The method of claim 1, wherein, the threshold associated with the difference between the current score and the base line score being breached indicates a regression in a performance of the false accept detection model.

9. The method of claim 1, wherein determining when the threshold associated with the difference between the current score and the base line score is breached is associated with isolating first data in the current score against second data in the base line score to determine whether the difference applies to changes in the automatic speech recognition model or changes in the natural language understanding model.

10. The method of claim 1, wherein the false accept detection model comprises one of a machine learning detection model, a quantity detection model, a brand detection model and a unit of measurement detection model.

11. A system comprising:
    a processor; and
    a computer-readable storage device storing instructions which, when executed by the processor, cause the processor to perform operations comprising:
        running a set of test utterances through a speech processing component that enables a spoken language dialog with a user to establish a base line score associated with processing the set of test utterances, wherein the speech processing component determines an intent of the user based on a user utterance in the spoken language dialog and routes the spoken language dialog to a network-based domain chosen from a plurality of network-based domains based on the intent;
        establishing an automatic test run of the set of test utterances to obtain a current score;
        in response to determining that a threshold associated with a difference between the current score and the base line score is breached;

transmitting an instruction to update a false accept detection model in view of changes to one of an automatic speech recognition model and a natural language understanding model to yield an updated false accept detection model; and switching, at the network-based domain, from the false accept detection model operating on the network-based domain to the updated false accept detection model.

12. The system of claim 11, wherein when the threshold associated with the difference between the current score and the base line score is breached, the operations further comprise determining that a traffic pattern has changed.

13. The system of claim 11, wherein the computer-readable storage device stores additional instructions which, when executed by the processor, cause the processor to perform operations further comprising:

isolating, from data associated with determining when the threshold associated with the difference between the current score and the base line score is breached, whether a change has occurred in the speech processing component, the automatic speech recognition model or the natural language understanding model.

14. The system of claim 11, wherein the false accept detection model comprises a neural network model comprising a long short-term memory artificial recurrent neural network architecture which uses one or more of a concatenation of word-level features associated with the user utterance, character-level features associated with the set of test utterances, automatic speech recognition output and natural language understanding output.

15. The system of claim 11, wherein the false accept detection model comprises a binary classifier which predicts whether the user utterance received at the network-based domain is associated with a configuration of the network-based domain or not.

16. The system of claim 11, wherein the computer-readable storage device stores additional instructions which, when executed by the processor, cause the processor to perform operations further comprising:

updating the set of test utterances to yield an updated set of test utterances;

running the updated set of test utterances through the speech processing component to establish an updated base line score;

establishing a second automatic test run, in a production phase of the updated false accept detection model, of the updated set of test utterances to obtain an updated current score at the network-based domain;

when a second threshold associated with a second difference between the updated current score and the updated base line score is breached:

switching from the updated false accept detection model to a third model;

transmitting a second instruction to update the updated false accept detection model in view of changes to one of the automatic speech recognition model and the natural language understanding model to yield a new updated false accept detection model; and switching from the third model to the new updated false accept detection model.

17. A method comprising:

running a set of test utterances through a speech processing component that enables a spoken language dialog with a user to establish a base line score associated with processing for the set of test utterances, wherein the speech processing component determines an intent of the user based on a user utterance in the spoken language dialog and routes the spoken language dialog to a network-based domain chosen from a plurality of network-based domains based on the intent;

establishing an automatic test run of the set of test utterances to obtain a current score; and in response to determining that a threshold associated with a difference between the current score and the base line score is breached:

transmitting an instruction to update a false accept detection model in view of changes to one of an automatic speech recognition model and a natural language understanding model to yield an updated false accept detection model; and switching, at the network-based domain, from the false accept detection model operating on the network-based domain to the updated false accept detection model.

18. The method of claim 17, wherein determining when the threshold associated with the difference between the current score and the base line score is breached is associated with isolating first data in the current score against second data in the base line score to determine whether the difference applies to changes in the automatic speech recognition model or changes in the natural language understanding model.

19. The method of claim 17, wherein the false accept detection model comprises one of a machine learning detection model, a quantity detection model, a brand detection model and a unit of measurement detection model and wherein the updated false accept detection model comprises the false accept detection model which does not use one or more of automatic speech recognition signals associated with the current score or natural language understanding signals associated with the current score.

* * * * *